Nov. 20, 1934.  E. F. NORTHRUP  1,981,629
METHOD AND APPARATUS FOR INDUCTIVE HEATING
Filed Oct. 7, 1930
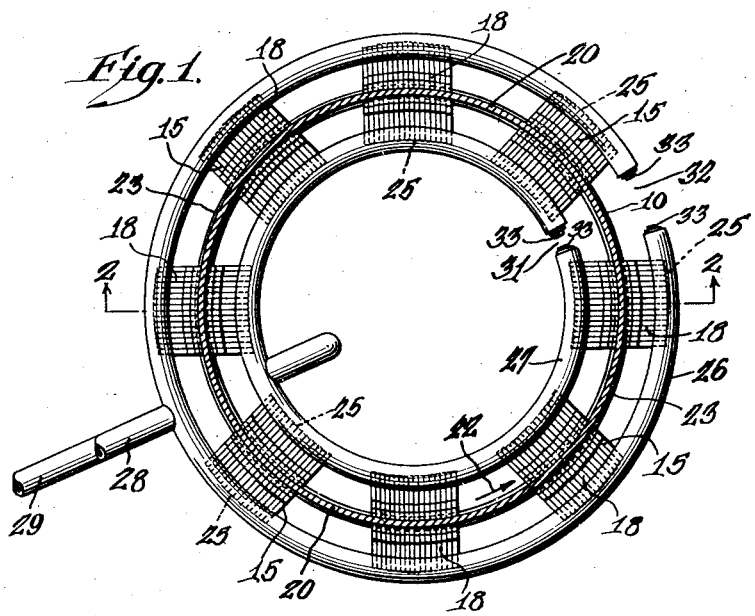
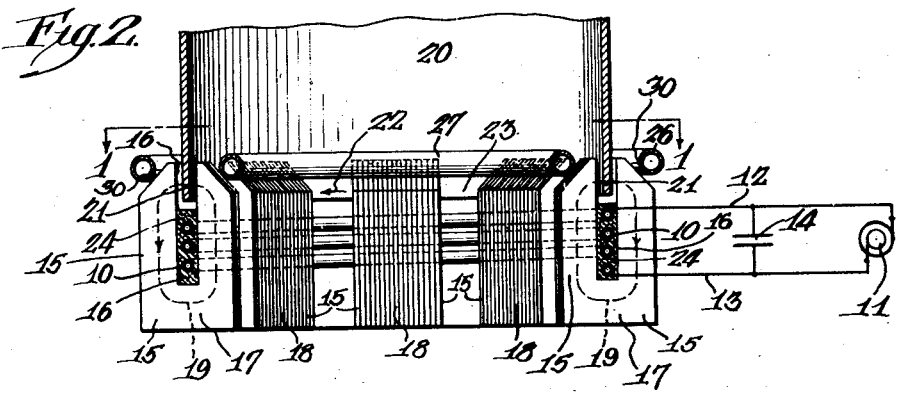
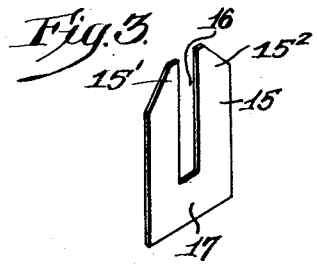
Inventor
Edwin F. Northrup
Witnesses:
Walter Chipp
Geo. C. Jepson
by
Wm Steell Jackson
Attorney.

Patented Nov. 20, 1934

1,981,629

UNITED STATES PATENT OFFICE 1,981,629

METHOD AND APPARATUS FOR INDUCTIVE HEATING

Edwin Fitch Northrup, Princeton, N. J., assignor to Ajax Electrothermic Corporation, a corporation of New Jersey Application October 7, 1930, Serial No. 487,029

10 Claims. (Cl. 219—13)

My invention relates to methods and apparatus for the inductive heating of a metallic charge of annular cross section. Where the charge is of considerable axial extent, as in a pipe, for example, my invention may be applied to heat the ends, but where its axial dimension is short, as in a ring, my invention will serve to heat the entire charge.

A purpose of my invention is to reduce the reluctance of the magnetic path between a single inductor coil and points inside and outside of a parallel annular zone to be heated, thus causing flux to pass transversely through the charge wall at the heating zone, and inducing current in the plane of the wall so that the induced current will travel around the annular heating zone.

A further purpose is to induce current in a charge at circumferentially spaced points around an annular heating zone, heating the parts of the zone between the points of induction by passage of induced current travelling around the zone.

A further purpose is to heat a short charge inductively while permitting the use of an inductor much longer than the charge by placing the inductor axially beyond the charge and transmitting energy from the inductor to the charge by magnets surrounding the inductor and the charge on opposite sides of both radially.

A further purpose is to convey magnetic lines of force from an inductor coil to a local zone of induction removed from the extreme end of the wall of a charge through prongs of a horseshoe or fork of magnetic material between which the charge is inserted.

In the application of induction by the prongs of a magnetic fork, a further purpose is to wind an inductor coil between the prongs and in the plane of their interior spaced edges.

A further purpose is to slit individual core sections from one side, part only of the distance to the opposite side, to place an inductor coil in the slits of a plurality of individual core sections arranged side by side continuously or intermittently around the circumference of the inductor, and to insert the charge into the open end of the slits.

A further purpose is to adjust individual slitted core sections to permit insertion into the slits of charges of varying curvatures by progressively partially uncovering the sections with respect to their neighbors.

A further purpose is to associate core lamina of predetermined shape in varying physical relationships to suit the form of the body to which and the source from which magnetic lines of force are to pass.

A further purpose is to cool slotted magnetic cores whose slots contain a charge to be heated by directing air against the outer edges of the cores.

Further purposes will appear in the specification and in the claims.

In the drawing I have shown a form of my invention which is convenient in use, easy to manufacture and which well illustrates the principles involved. By thus illustrating my preferred form as required by the statute, I do not, however, intend to limit myself to the details of the structure shown.

Figure 1 is a section of Figure 2 on the line 1—1, omitting the electrical circuit.

Figure 2 is a section of Figure 1 on the line 2—2.

Figure 3 is a detail perspective of one of the core sections.

In the drawing like numerals refer to like parts.

Heating of narrow zones at the ends of objects of annular cross section, such as pipes or tubes, without appreciably heating the objects beyond the narrow zones is demanded for certain purposes, as for example for shaping and flanging.

In one case of which I know, it is required that an annular zone, of not more than an inch and one-half in width, extending around the ends of pipes varying in diameter from eight to twenty-six inches and varying in wall thickness from one-eighth to five-sixteenths of an inch, be heated to a uniform forging temperature (1100° C.) in thirty seconds, and that the parts of the pipes outside of the heating zone remain relatively cool.

Direct fuel and ordinary muffle heating are out of the question, because heat could not be applied quickly enough to meet the time requirement, and because heating would be so slow that a large part of the pipe would be highly heated before the end reached forging temperature.

Conductive electrical heating by current applied through contacts would be unsatisfactory because of the presence of the contacts, the high surface resistance of the pipe, and the unevenness of the heating due to inequalities in distribution of the current.

Inductive heating in the ordinary manner, as by placing an inductor coil around the outside or within the inside of the zone to be heated would meet with several difficulties.

Where the heating zone must be limited to an inch and one-half, it would hardly be possible to wind an inductor coil to meet the requirements, especially for such rapid heating.

There are other problems as well as the heating of the ends of pipes which are difficult to solve by ordinary inductive heating, as for example the heating of narrow annular zones of pipes back from the ends without heating the ends, the rapid uniform heating of narrow zones in the walls of metal boxes, cans and containers and the heating of metal rings.

In the case of a hollow charge such as a pipe whose end only is to be heated there is difficulty in delivering sufficient power input from a surrounding or interior inductor coil to the pipe to heat the end of the pipe before the heat has travelled by conduction to a considerable adjoining extent of pipe.

I find that much the same effect of circumferential current induction about the end of the pipe can be effected with a high concentration of current by applying magnets on opposite sides of the end of the pipe, inside and out, at intervals spaced circumferentially about the pipe, the current for the magnets being supplied by an inductor axially beyond the end of the pipe, whether in line with it or not. This permits the inductor to be given any desired length without regard to the length of the portion of the end of the pipe (charge) which is being heated. The flux is here transverse to the circumferential pipe elements along which the current is to travel, resulting in the same direction of secondary current flow that would be produced by primary current passed circumferentially about the end of the pipe.

By my invention I may satisfactorily meet requirements to heat uniformly and quickly narrow or wide zones in the walls of charges of hollow annular cross section, such as metal pipes, tubes, rings, cans, boxes, etc. By mentioning "annular" cross section I do not mean to limit myself to the heating of charges of external or internal circular shape, although ordinarily the charges will be of this shape (pipes, tubes, etc.), but I intend to indicate that the charges are in cross section hollow closed figures, such as circles, ellipses, squares, rectangles, irregular shapes or other configurations.

The fact that the charges are hollow permits one of the poles of each of the electromagnets to be inserted within the charge, giving a direction of flux perpendicular to the length of the tube or other object being heated, and also perpendicular to the circumferential or perimetal elements of the charge; so that notwithstanding the difference in direction of flux the current induced by reason of the flux will be in the same direction as would be true if the inductor circumferentially surrounded the end of the charge. I thus accomplish the heating with apparatus which is cheap and simple to manufacture and which is adjustable to various sizes and shapes of charge and to various heating requirements.

As the shortest path is in a plane perpendicular to the charge axis, and as the shortest path will be that of lowest resistance, the great bulk of the current will flow about the charge in an annular path in planes perpendicular to the coil axis.

It should be noted that it is not necessary that induction take place continuously around the heating zone. Where the charge wall is cut by flux at circumferentially spaced points around the charge, be they few or numerous, current induced in these points will be conducted throughout the heating zone, heating parts of the charge between points of induction by the passage of the current induced.

Throughout the heating zone $RI^2$ heating will take place, and, if the charge be magnetic, there will also be hysteresis heating.

Provided the flux cuts the charge wall transversely and that one magnet pole be interior I may vary the position of the inductor coil, as wall as the shape of the low reluctance path used to convey the flux from the inductor to the point of application to the charge. My form of flux application permits the use of an annular coil for one or many magnets, larger or smaller, or the same diameter as the charge. It may generally parallel the contour of the charge or not as desired.

As the best embodiment of my invention is in the heating of the ends of pipes under the requirements heretofore mentioned, I will now more particularly describe a form well suited to that purpose.

Referring to the drawing, I illustrate an inductor coil 10, which may desirably be constructed of hollow water-cooled tubing as indicated, and which is supplied with alternating current from a conventional source 11 through leads 12 and 13. The power factor may be corrected, as by the condenser 14.

Surrounding the inductor coil 10 at suitable intervals, I place horseshoes or forked magnets 15, slotted at 16 from one end part of the distance to the opposite end, but continuous at 17 at the end opposite to the slotting.

The magnet 15 may very desirably be a stamping of transformer iron or high silicon steel of proper thickness so that, when grouped with other similar cores, the composite mass will be sufficiently laminated to avoid excessive eddy currents.

The individual magnets 15 may be associated into groups 18, each of which consists of a number of individual magnets placed side by side and partially uncovering their neighbors as later explained.

Assuming a direction of current through the inductor coil, the path of the flux about the inductor coil and through the electromagnets 15 will be in the plane of the magnets as indicated at 19 in Figure 2.

In the open ends of the slots 16 I insert the charge 20, here indicated as a pipe or tube. Since the charge is normally magnetic, the charge will reduce the reluctance of the gap formed by the slot 16, and the magnetic circuit will be completed by flux travelling transversely through the wall of the charge as at 21, and perpendicular to the surface of the charge. Since the induced current flows in planes perpendicular to the flux, the current will flow annularly around the end of the charge as indicated by the arrow 22.

Even with a nonmagnetic charge, or one heated to decalescense, considerable flux will take the path 21 through the charge. In case of possible short circuiting of flux across the gap above the inductor and below the end of the charge, the slot 16 can be made wider at this point.

Where the heating zone is not at the end, but is farther up in the charge, the slot can also be widened opposite the parts of the charge wall which are not in the heating zone.

At points such as 23 between the groups 18 of individual magnets, substantially the same current will be carried as in the parts of the charge wall between the poles 15', 15² because the individual current travels annularly through the charge. In this way, parts of the charge within the slots 16 will have current induced directly in them and will be heated by the induced current, while parts of the charge wall between the groups of individual magnets will be heated to the same extent because the current induced elsewhere will pass through them.

In this way I obtain uniformity of heating of the end of the charge without the necessity of continuously covering the end of the charge by magnets. The proportion of the circumference of the charge placed between the poles and that outside of the poles will be material to the speed of heating but will not be material to the uniformity of heating.

Depending upon the power input which I desire to obtain, I will place more or fewer individual magnets about the circumference of the charge. For a particular case the number, strength and spacing can be determined easily.

Where there is a tendency for the inductor coil to become excessively heated by heat radiation from the charge, I place suitable insulation 24 about the inductor coil within the slots 16. This may be used to electrically insulate the inductor coil from the magnets also.

It frequently happens that the dimensions and shapes of the charges to be heated vary from time to time, and I can suit my heating installation to any diameter or shape of charge which is to be handled. For example, if a larger charge is to be heated than that shown in the figures, the inductor coil may be removed and wound to suitable larger diameter, or a new inductor coil may be used, and the magnets may be spaced circumferentially about the larger inductor coil in the general manner illustrated, with or without the addition of other magnets.

Similarly, for a different shape of charge, such as a rectangular charge, I will place a suitable number of magnets over an inductor coil of the required shape.

As shown in Figure 1, each magnet slightly uncovers its neighbor to allow for the curvature required in the inner slots. Thus the groups of magnets present a somewhat irregular generally arcuate inner and outer edge surface as seen at 25.

While I prefer to group the slotted magnets as shown, they may, if desired, be spread in fan form to lie in planes through radii, or may be arranged in any other suitable manner. For some installations it may be desirable to extend the magnets continuously about the inductor coil and charge, and of course this can be done in such cases.

As the magnets are likely to become heated by radiation, convection, or otherwise, I show suitable cooling means, consisting of air pipes 26 and 27 supplied with inlet connections at 28 and 29, and having outlet openings 30.

In order to prevent inductive heating of the air pipes themselves, I will make them discontinuous as at 31 and 32, closing the ends with plugs 33.

While the low reluctance paths from the inductor to the charge are very important to my invention, it will be evident that inductive heating will also occur from flux passing from the inductor to the charge through paths of high reluctance.

By the structure shown in my invention, I am not limited to any particular frequency. I consider that good results may be obtained with current of the order of about 1000 cycles in order to heat steel or iron above decalescence.

Where the material being heated is nonmagnetic or where higher temperatures are to be obtained, I may employ higher frequencies. For thick walled charges, lower frequencies offer the advantage of increased depth of penetration.

I believe that I am the first to induce high frequency current at spaced points about the circumference of a charge of annular cross section and to conductively heat the intermediate points by current passing annularly from the points of induction.

I also believe that I am first to conduct flux from an inductor coil through a forked magnetic circuit, one fork of which is inside and the other of which is outside the inductor turns, to a charge placed in the gap between the forks.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new and desire to secure by Letters Patent is:—

1. In an electric induction furnace for heating the end of a hollow charge, an inductor coil having a portion generally conforming in shape to that of the charge, and a plurality of individual slotted magnets placed over the turns of the inductor so that the inductor lies in the slots and leaves sufficient space at the open ends of the slots to admit the charge, whereby the same individual slotted magnets may be used for charges of various diameters.

2. In an electric induction furnace for heating the end of a pipe, an inductor coil spaced axially from the end of the charge, circumferentially following the end of the charge and of substantially the diameter of the charge and a plurality of groups of individual U-shaped magnets having legs placed one inside and one outside of the inductor coil and the legs extending one inside and one outside the end of the charge and adjustable in number and spacing for different diameters of charge.

3. In an electric induction furnace, an inductor coil, a plurality of individual slotted magnets fitting over the inductor coil, adjustable in number and spacing, and adapted to admit the charge to the ends of the slots and air jets for application to the outside of the magnets to cool them.

4. In a heater for the end of a pipe, an inductor coil beyond the end of the pipe, axially in line with the pipe and circumferentially following the end of the pipe in inductive relation to the end of the pipe during use of the heater and a plurality of slotted pieces of magnetic material placed one beside another straddling the inductor coil and the end of the pipe, with the inductor extending through the slots in the pieces, whereby the end of the pipe is heated by direct induction from the current passing circumferentially of the end of the pipe and by the flux passing radially through the pipe from the magnetic pieces.

5. In a heater for the end of a pipe, means for passing alternating current circumferentially following the pipe in prolongation of the end of the pipe, and in inductive relation to the end of the pipe and means for passing flux through the end of the pipe radially of the pipe.

6. In a heater for the end of a pipe, an inductor coil of substantially the diameter of the pipe, located in prolongation of the end of the pipe, axially in line with the pipe and in inductive relation to the end of the pipe during use of the heater, magnetic material extending around the end of the inductor coil remote from the pipe and inside and outside the inductor coil and the end of the pipe and a source of alternating current connected to the inductor coil.

7. In an electric induction furnace for heating the end of a pipe or similar hollow charge, an inductor coil in inductive relation to the end, circumferentially following the end and located in prolongation of the end, means for supplying alternating current to the inductor coil and magnetic material extending inside and outside the end and around the inductor coil, whereby flux from the inductor coil passes through the magnetic material and across the end.

8. In an electric induction furnace for heating the end of a pipe or similar hollow charge, an inductor coil located at the end in inductive relation to the end and a plurality of groups of individual magnetic yokes, each extending around the inductor coil and inside and outside the end, said yokes being variable as to number and spacing to heat charges of different diameters.

9. In an electric induction furnace for heating the end of a pipe or similar hollow charge, an inductor coil of the charge diameter, in inductive relation to the end and located in prolongation of the end circumferentially following the end, means for supplying alternating current to the inductor coil, and a plurality of magnetic yokes each extending around the inductor coil and inside and outside of the end, said yokes being adjustable in number and spacing to heat charges of variant dimensions.

10. The method of heating the end of a pipe or similar hollow charge, which consists in inducing in the pipe alternating current flowing circumferentially of the pipe at the end and in simultaneously inducing in the pipe eddy currents circulating around circumferentially spaced points of especially high flux intensity near the end of the pipe.

EDWIN FITCH NORTHRUP.